United States Patent [19]

Weiss et al.

[11] 3,877,816

[45] Apr. 15, 1975

[54] REMOTE-ANGLE-OF-ROTATION MEASUREMENT DEVICE USING LIGHT MODULATION AND ELECTRO-OPTICAL SENSORS

[75] Inventors: Ralph A. E. Weiss, Glen Burnie; Donald G. Frey, Ellicott City, both of Md.

[73] Assignee: Westinghouse Electric Corporation, Pittsburgh, Pa.

[22] Filed: Apr. 19, 1974

[21] Appl. No.: 462,488

[52] U.S. Cl. .............. 356/138; 356/114; 356/152; 250/225
[51] Int. Cl. .......................................... G01b 11/26
[58] Field of Search .......... 356/114, 116, 117, 138, 356/28, 152; 250/225

[56] References Cited
UNITED STATES PATENTS

| | | | |
|---|---|---|---|
| 3,306,159 | 2/1967 | Beal et al. | 356/114 |
| 3,474,255 | 10/1969 | White | 356/114 |
| 3,804,522 | 4/1974 | Smith | 356/114 |

*Primary Examiner*—Ronald L. Wibert
*Assistant Examiner*—Paul K. Godwin
*Attorney, Agent, or Firm*—D. Schron

[57] ABSTRACT

An electro-optical system is disclosed for measuring rotational angle. The apparatus includes a rotating disc-type linear polarizer in combination with a reference linear polarizer and a target linear polarizer. Photosensors are arranged to receive modulated light separately from the target and reference polarizers. Sinusoidal output signals representative of the modulated light received by the photosensors are generated. An electrical phase difference detecting unit compares sinusoidal signals from the target and reference sensors and generates a signal representative of phase difference. The angle of rotation between the reference linear polarizer and the target linear polarizer is thereby converted to a representative signal which may be used to drive a servo motor or other device operatively connected to the target polarizer directly or indirectly. This reference polarizer may be held in a fixed position or it may be mounted on an independently rotatable element.

Angle measurement systems herein disclosed may be used in servo loops, as follow-up control devices or angle measurement pick-off applications. Devices controlled by an operator head motion can be used for hands-free control of machines, tools, weapon systems, or radar antenna positioning systems. Because mechanical linkages are not required between the elements of the system, systems according to the present invention are especially useful for remote optically-coupled sensing and control systems.

10 Claims, 5 Drawing Figures

REMOTE-ANGLE-OF-ROTATION MEASUREMENT DEVICE USING LIGHT MODULATION AND ELECTRO-OPTICAL SENSORS

BACKGROUND OF THE INVENTION

1. Field of the Invention

This invention relates to angle transducers. In particular, it relates to an optical means for measuring the rotational angle of one or more devices or to detect relative angular displacement between elements.

2. Description of Prior Art

Transducers which function to convert amount and direction of rotational movement to electrical signals are particularly desirable for measurement and control. Various systems are known for detecting rotary movement and providing an electrical output proportional to the relative motion of two mechanical elements, such as shafts or the like. Prior art devices of the synchro type or of the type generating a series of pulses to be counted are known; however, these are bulky and relatively expensive.

Remote or optically-coupled rotational angle sensors presently available ordinarily employ space triangulation measurement techniques. These methods require simultaneous solutions to three-dimensional geometrical equations and involve use of extensive computer circuitry for obtaining the desired measurement. Rotational measurement in a single plane becomes a complex operation requiring much equipment when using this method. Angle measurement devices which are mechanically or electrically coupled to a rotating mechanism, such as used in servo loop follow-up or pick-off applications, are in frequent use.

The known types of angle rotation sensors can be replaced in many cases with an optically coupled measurement device described herein.

Previous techniques for sensing rotary angular position and for providing a reference input signal to system electronics, have required either direct electromechanical couplings to the rotary device or extensive computer mechanization for deriving position through optical triangulation methods. Optical measuring systems are available which utilize crossed linear polarizers for the purpose of detecting angle rotation. Various photoelectric, semiconductor or photosenstiive elements are used for converting electromagnetic energy to a representative signal.

Typical prior art rotation detectors which employ crossed polarizers require careful matching of two or more sensors. In U.S. Pat. No. 3,474,255, a shaft mounted system employs two light polarizers angularly displaced by 90° on one shaft. A third polarizer is mounted on another shaft. Light received by photocells from each of the displaced polarizers is converted to a current or voltage differential. The displacement or error signal is then used to drive a servo motor to keep the two shafts synchronized.

In U.S. Pat. No. 3,306,159, a polarizing sheet attached to a rotary member is illuminated by non-polarized light. A set of four orthogonally related polarizing filters have four associated photosensors. These sensors are connected in a bridge circuit which provides an output signal whose phase angle is representative of the rotation angle of the rotary member.

Angular measurement devices employing polarized radiation are also disclosed in U.S. Pat. Nos. 2,998,746 and 3,521,071.

SUMMARY OF THE INVENTION

A novel rotational angle measurement system has been discovered which is based upon the principle that electromagnetic waves transmitted through a series of linear polarizers varies as the square of the cosine of the included angle between the axes of polarization. Disclosed herein is a system for measuring rotational angle which comprises means for directing electromagnetic waves having random polarization along a plurality of paths. A plurality of corresponding sensors are adapted to receive the electromagnetic waves separately along these paths and provide sinusoidal signals representative of modulated radiation. A plane polarizer mounted transverse to the paths is provided, including means for rotating the polarizer at angular rate $\omega$. Means are provided for plane polarizing electromagnetic waves along one of said paths as a reference and along another of said paths as means for measuring rotary motion relative to the reference. Phase difference means for comparing sinusoidal signals from the plurality of sensors generates a signal representative of the phase differences between the modulated electromagnetic waves. The phase difference signal is representative of the difference in rotational angle between the reference means and the rotary measuring means.

A remote target can be compared to the rotational angle of a fixed index or movable reference.

DETAILED DESCRIPTION OF THE INVENTION

Throughout the description, reference is made to light as a preferred embodiment for use herein; however, it is understood that other portions of the electromagnetic spectrum are also suitable.

Figure 1:
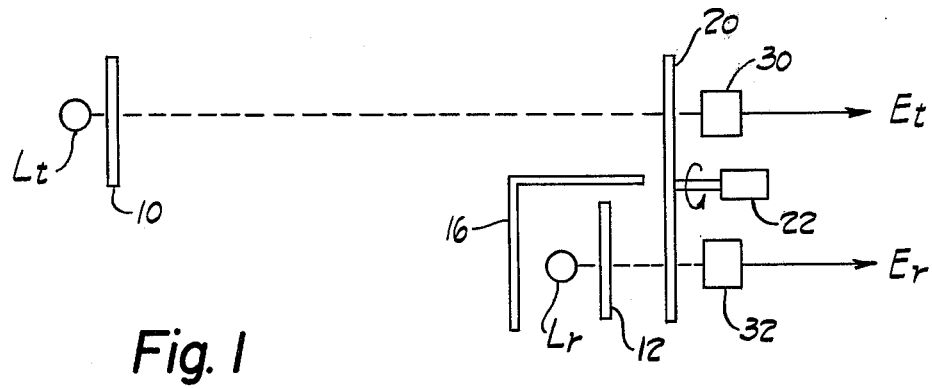
FIG. 1 is a schematic representation of an angular measuring system according to the present invention including a representation of light sources, linear polarizing elements, and photosensors.

Referring now to FIG. 1, a first source of unpolarized electromagnetic waves $L_t$ is provided for directing electromagnetic waves along a path through a first target polarizer means 10. A second source of unpolarized electromagnetic waves $L_r$ is provided for directing said waves along a separate path through a linear reference polarizer 12. Baffle means 16 provide separation of said paths. Means are provided for rotating a plane polarizer disc 20 transverse to the paths of electromagnetic waves coming from sources $L_t$ and $L_r$, respectively. A suitable means for rotating the linear polarizer 20 at constant speed is provided by connection to a rotary motor 22. This rotating disc polarizer is adapted to modulate electromagnetic waves dynamically from the target polarizer 10 and reference polarizer 12. A plurality of electromagnetic sensor means 30, 32 are provided to receive the electromagnetic waves separately along the paths from sources $L_t$ and $L_r$ and to provide sinusoidal electrical signals representative of the modulated target polarizer wave and modulated reference polarizer wave received through the rotating disc linear polarizer 20. Sensor means 30 and 32 may include any suitable electromagnetic detector such as photodiodes, photosensitive semiconductors, etc. Output from sensor 30 is a sinusoidal electrical signal $E_t$. The frequency of the sinusoidal wave is controlled by the constant rotary speed of motor 22, driving polarizer disc 20. The output of sensor 32 is electrical sinusoidal signal $E_r$. Each of these signals is representative of the modulated waves received from sources $L_t$ and $L_r$, respectively.

Figure 2:
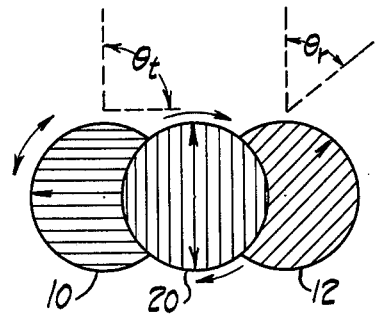
FIG. 2 is a representation of linear polarizing elements showing the relative angular positions.

Referring now to FIG. 2, an explanation of the angular relationships between polarizers 10, 12 and 20 is set forth. These polarizers are shown schematically with the direction of linear polarization indicated by arrows and parallel lines. Taking the vertical linear polarization axis of polarizer disc 20 as a mechanical axis, the angular orientation of target polarizer 10 creates an angle $\theta_t$ with the direction of polarization for disc polarizer 20. Reference polarizer 12 is disposed at a different angular relationship to the disc polarizer 20 and forms another angle $\theta_r$.

For a pair of identical linear polarizers with their planes parallel, the transmittance for non-polarized light is a function of axis alignment or:

Transmittance $T = (H_0 - H_{90}) \cos 2\theta + H_{90}$ where $H_0$ is the combined transmittance for parallel axes, for $\theta = 0, 180°$. $H_{90}$ is the combined transmittance for crossed axes, for $\theta = 90°, 270°$. $\theta =$ the included angle between the linear polarizer axes.

Since $\cos 2\theta = \dfrac{1 + \cos 2\theta}{2}$; then $T = \dfrac{H_0 + H_{90}}{2} + \dfrac{H_0 - H_{90}}{2} \cos 2\theta$ or $T = K_1 + K_2 \cos 2\theta$ where $K_1 = \dfrac{H_0 + H_{90}}{2}$ and, $K_2 = \dfrac{H_0 - H_{90}}{2}$ Since a measure of included angle $\theta$ can be obtained by determining the polarizer pair transmittance, an electro-optical light sensor 30 (such as a photodiode, photocell, etc.) can be employed to measure the transmitted light level.

For the three-polarizer system depicted in FIG. 2, illuminated polarizer 10 is mounted on a target requiring rotational measurement relative to a reference attitude. Rotating disc 20 is driven at a constant angular rate $\omega$, so that the associated target sensor receives electromagnetic waves modulated as a function of $\theta - \omega t$. This will monitor a target transmittance $T_t$ such that:

$T_t = K_{t1} + K_{t2} \cos 2 (\omega t + \theta_t)$ where $\theta_t$ is the included angle between the target polarization axis and a mechanical reference axis as shown.

The sensor output $E_t$ will be a cosine function at twice the mechanical rotational frequency or:

$E_t = E_{t1} + E_{t2} \cos 2 (\omega t + \theta_t)$ volts, assuming that the sensor is operated over its linear range.

If an illuminated reference linear polarizer 12 is added to the system as shown in FIG. 2, a second cosine light function is obtained at sensor 32 such that $T_t = K_{r1} + K_{r2} \cos 2 (\omega t + \theta_r)$ and a corresponding electrical function $E_r = E_{r1} + E_{r2} \cos 2 (\omega t + \theta_r)$, where $\theta_r$ is the included angle between the reference polarization axis and a mechanical axis as shown. $\theta_r$ can be made adjustable for calibrating the zero angle position.

Figure 3:
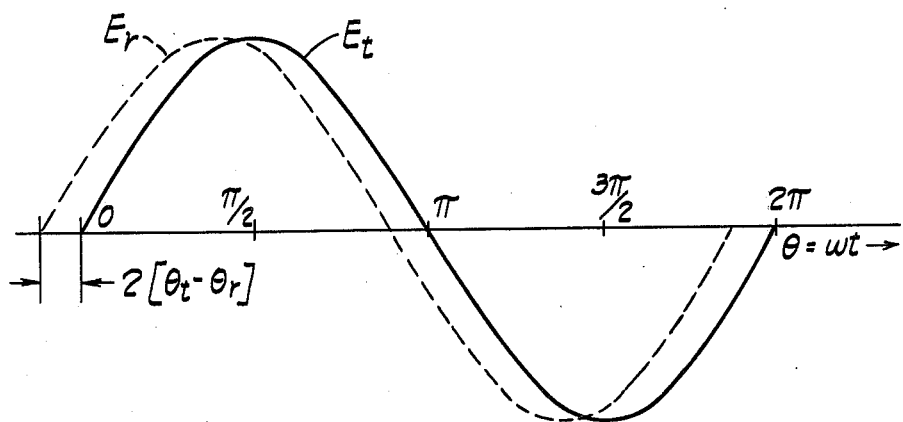
FIG. 3 is a graph of sinusoidal output signals showing phase differences.

Voltage outputs $E_t$ and $E_r$ are shown in FIG. 3.

Figure 5:
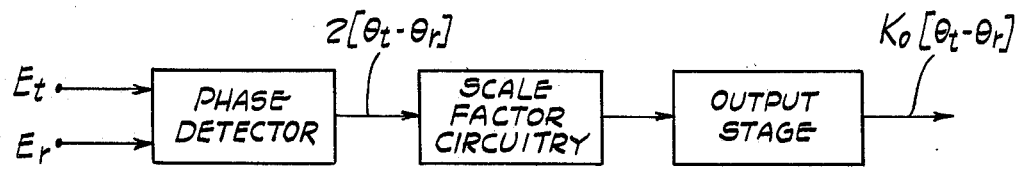
FIG. 5 is a block diagram of the electrical functions utilizing the output signals from the angle measurement system.

By using a phase detector, one is able to determine the phase difference between outputs $E_t$ and $E_r$ and thus define the quantity $2 (\theta_t - \theta_r)$ in electrical degrees. Because mechanical degrees of rotation are represented by the quantity $K (\theta_t - \theta_r)$, only appropriate scale factor and output circuitry are required to complete the system, as shown in FIG. 5. Electrical output of the phase detector can be adapted by the scale factor to give amplitude (e.g. - volts/degrees) required by typical equipment to which the angular measurement is delivered. An output stage can provide the output impedance or interface requirement to be compatible with other equipment utilizing the angular measurement. Typically, an amplifier functions for the scale factor, and the output stage is a voltage follower. It is understood by one skilled in the art that the scale factor function can be combined with either the phase detector or output stage. The graph in FIG. 3 shows two superimposed sinusoidal signals. In the present case, these are conveniently represented as output voltages $E_t$ and $E_r$, corresponding to target and reference waves, respectively. The phase difference in electrical degrees is depicted as a function of $\theta_t - \theta_r$, the mechanical angles. While amplitude of the sinusoidal signals is shown herein as equal, the system can operate well with unequal amplitudes.

It should be noted that several variations of the configuration of FIG. 1 are possible and are considered a part of the inventive concept. For example, the positions of light source and corresponding light sensor may be interchanged with each other, as further shown in FIG. 4. This alternate applies to either or both of the light modulating systems, (i.e., the target or reference light polarizing sets). The light source and corresponding polarization frequency bandwidths may be broad (white light), or deliberately narrow (for improved signal-to-noise ratio). The center frequency of the system is limited to the electromagnetic frequency spectrum only by the range of linear polarizers and sensors available as state-of-the-art devices.

Figure 4:
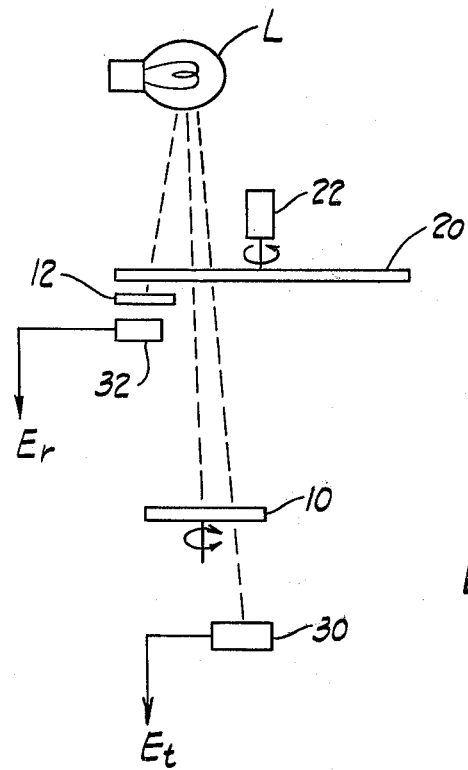
FIG. 4 is a schematic representation of an alternative embodiment of the rotational angle measurement system.

The light sources shown in FIGS. 1 and 4 can be deleted in cases where the ambient light is of a nature and level sufficient to be detected with usable signal-to-noise ratio. In these instances reflectors and light gathering optics may be used to take advantage of ambient light as a primary source.

In FIG. 4 an alternative embodiment is shown schematically. The light from a single incandescent lamp source L is emitted and passed through rotating linear polarizing disc 20. Light traveling along one path is directed through a movable target linear polarizer 10 and received by a first photosensor means 30, which generates a sinusoidal electrical output signal $E_t$ representative of the modulated target polarizer light. A separate path of light is directed through a fixed index or movable reference linear polarizer 12 and received by a second photosensor 32. This sensor puts out a similar representative signal $E_r$. As in the other embodiments, the output signals are fed to a phase difference detecting means having means for generating a signal representative of rotational angle between target and reference polarizers.

While particular emphasis is given to those embodiments employing light, the electromagnetic spectrum contains several bands which can be plane polarized. Existing electromagnetic sensors and polarizers are available for the visible portion of the spectrum, as well as infrared, ultraviolet and microwave applications.

The light source may be an incandescent lamp or other means for emitting broad band light. Preferred sources for visible and infrared waves comprise narrow band or monochromatic light emitting diodes (L.E.D.), well known in the art. The electromagnetic source and/or sensor may be provided with means, such as dichroic filters, for transmitting selected portions of the electromagnetic spectrum.

The wave source should be substantially unpolarized. Randomly polarized light may be obtained from a fiber optics-type system having means for directing light from one or more light emitters along a plurality of separate paths using conventional optical elements. Where a single source is divided to provide separate paths, care should be taken to preserve the random properties of the electromagnetic waves. Beam splitters, such as those employing partial reflectance, are usually undesirable because of polarization. Ordinarily, the source of electromagnetic waves is substantially continuous, with little fluctuation in intensity. However, pulsed sources may be utilized in conjunction with demodulation means in the output circuitry. Such pulse forms would be a function of the angular rate of the rotary polarizer disc.

A significant advantage of the present system is the elimination of matching the intensity of light source for the target and reference sensors. A substantial difference in signal amplitude can be tolerated without affecting operation of phase difference circuitry.

Standard electrical phase detection equipment can be used to extract the phase difference information. Output of the phase difference measuring circuit can be converted to analogue or digital readout, as required.

The requirements of the optical system are relatively simple. Included in the operatively-connected system are means for projecting randomly polarized electromagnetic waves from a source along a plurality of paths to a corresponding plurality of electromagnetic detectors. Along the paths, the electromagnetic waves are modulated by the rotating linear polarizer in combination with another linear polarizer, mounted as a fixed index, movable reference, or independently movable target. The polarizers may be mounted in a position normal to the path of rays (angle of incidence = 0), or the polarizers may transmit the waves at incident angles up to the Brewsterian angle of the polarizer materials. For typical optical polarizers, an angle of incidence from 0 up to about 67° is operative.

The target and reference can be remotely located with ease; however, the optical paths should be clear of additional elements which induce undesired polarization. Once the modulation of light is achieved by passing through the analyzer, the polarization characteristics may be modified. In the use of this system for measuring the rotational angle of a remotely mounted target analyzer, it is possible to place a reflective surface behind the analyzer to reflect the modulated light back through the analyzer toward the detector. In one alternative embodiment, the wave passes from the source through the rotary polarizer, through a remote target analyzer, and approaches a reflective element at a normal angle of incidence, whereby the wave is reflected back through both the analyzer and the rotary polarizer before being detected by a photosensor mounted on the same side of the rotary polarizer as the light source. The reflective surface may be a mirror or light-scattering matte reflective element. In using mirrors to direct modulated waves, the rays should be incident at less than the Brewsterian angle.

The purpose of the rotating linear polarizer disc is to provide a usable frequency of modulated electromagnetic waves. This includes means for plane polarizing and dynamically rotating the waves at essentially constant angular rate. The rotating disc polarizer provides these functions with a unitary structural element. Any suitable motor and/or rotary linkage which can drive a linear polarizer in a circular motion can be adapted to work in this electro-optical system. The angular rate is ordinarily chosen to correlate with the available power source, which may be 60 hertz line voltage, chopped D.C., etc. Relatively low frequencies are preferred. Typical electro-optical elements are described in U.S. Pat. Nos. 3,521,071, 2,998,746, 3,306,159 and 3,474,255. Electrical phase difference measuring circuits are well known. For instance, in U.S. Pat. No. 3,520,615 an electronic phase measuring device is disclosed utilizing a rectangular wave system in which the rise of the rectangular wave is derived from a recurrent point of one sinusoidal channel and the fall from a corresponding point of the other sinusoidal channel.

Where the relative movement of a target is measured without reference to a movable reference, it is possible to substitute an electrical signal equivalent to that $E_r$ which would be generated by a fixed index reference. A suitable electromechanical means, such as an armature mounted on the rotating shaft of the rotary polarizer inside a magnetic field could be utilized to generate a cosine reference signal.

Several practical applications of this system are suggested. Shaft angle or other rotational motion may be measured without mechanical linkage to a remotely located instrument. The requirements for use are a clear optical path and the capability for affixing a piece of illuminated sheet polarizer to the shaft end or otherwise operative with the plane of rotation. Illumination sources include ambient light and waves provided by external projection means. There are considerable advantages over mechanical coupling of lowered weight, mechanical backlash, and shaft friction for the optical method. Because optical coupling may be by means of telescopic lens, the word remote has literal meaning in that the sensor may be located at extreme distance. The new system can be utilized as a basic sensor for a helmet sight used for operator head-motion control of weapon systems or radar antenna positioning systems. This would include both airborne and surface applications and would be applicable horizontally or vertically to any rotary military device requiring directional operator control. Hands-free operation allows the operator to perform other manual tasks. An associated head-mounted optical sight may be used for accurate positioning.

In adapting the invention for controlling a mechanical rotation in response to motion of the head or other rotary member, a linear polarizer is mounted so as to